Oct. 13, 1959  E. D. DAARUD  2,908,356
SPRING DRIVE FOR BICYCLE
Filed March 14, 1957  2 Sheets-Sheet 1
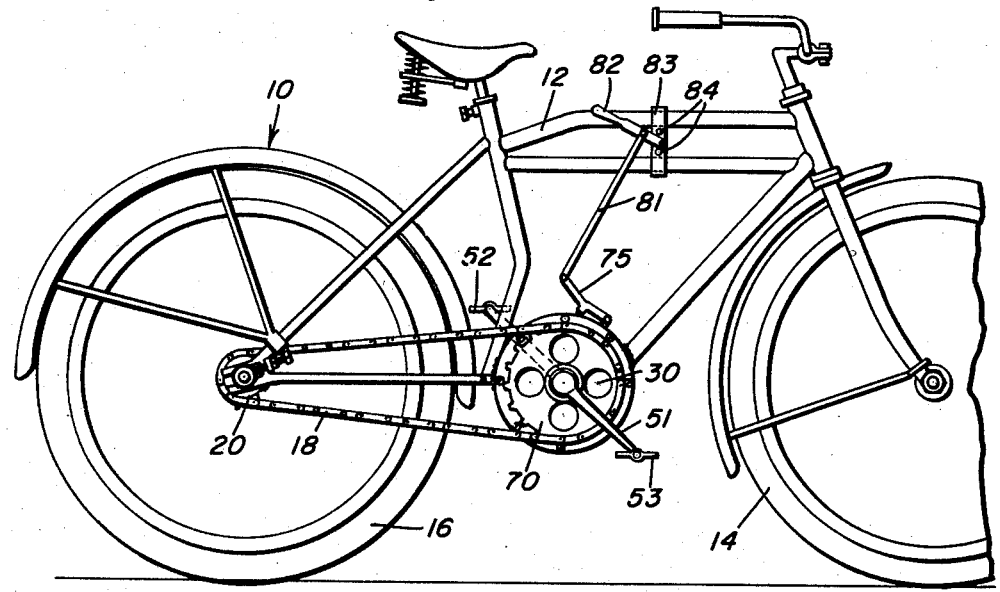
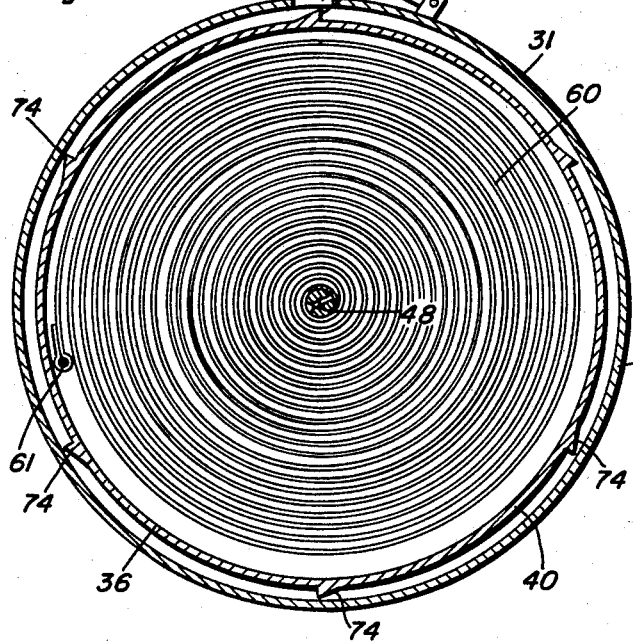
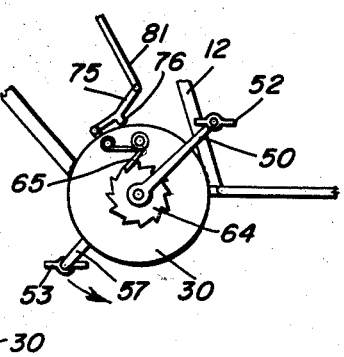
Earl D. Daarud
INVENTOR.

Oct. 13, 1959 E. D. DAARUD 2,908,356
SPRING DRIVE FOR BICYCLE
Filed March 14, 1957 2 Sheets-Sheet 2
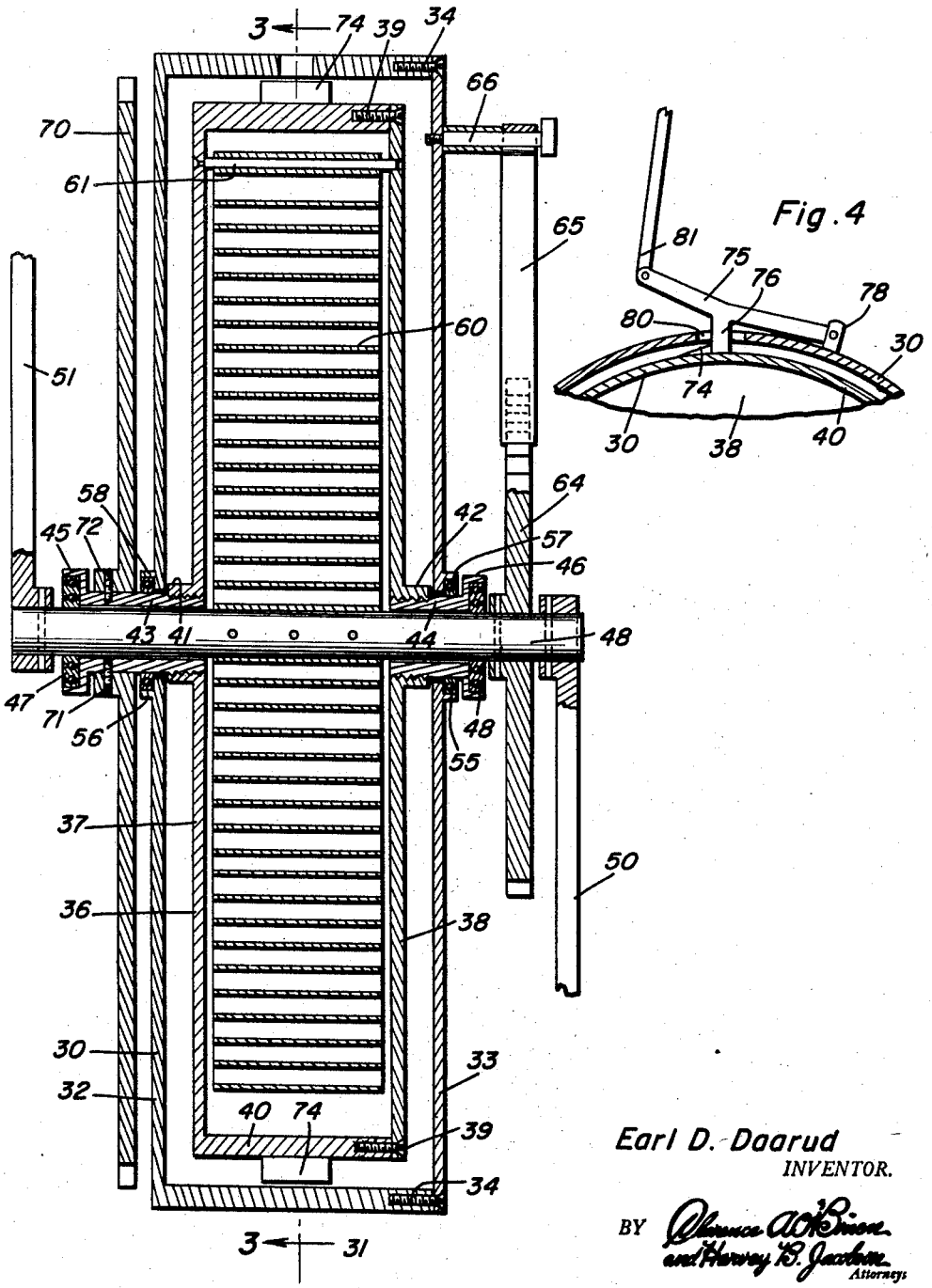
Earl D. Daarud
INVENTOR.

United States Patent Office 2,908,356
Patented Oct. 13, 1959

2,908,356
SPRING DRIVE FOR BICYCLE
Earl D. Daarud, Mandan, N. Dak.
Application March 14, 1957, Serial No. 646,129
2 Claims. (Cl. 185—39)

This invention relates to bicycles and more particularly to the drive mechanism for bicycles.

An object of the invention is to provide a drive mechanism for a free wheeling coaster brake bicycle which facilitates the over-all operation of the bicycle.

A more specific object of the invention is to provide spring means in the drive of a bicycle which may be conditioned to generate energy from operating the bicycle pedals so that the energy is available when a demand for it occurs such as in climbing a hill or riding against a head wind. The energy is rendered available during the normal pedaling of the bicycle.

Another object of the invention is to provide a drive mechanism for a bicycle, wherein the crank arms are drivingly connected with a driveshaft whose power is delivered to the drive sprocket through an intermediary spring. Accordingly, the spring is wound in response to normal actuation of the bicycle pedals and this energy is capable of being stored in the spring for application.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a side elevational view of a bicycle which is constructed in accordance with the invention;

Figure 2 is a vertical sectional view of the drive mechanism in accordance with my invention;

Figure 3 is a vertical sectional view taken on the line 3—3 of Figure 2;

Figure 4 is a fragmentary sectional view showing locking means for a power drum of the drive mechanism, and;

Figure 5 is a fragmentary elevational view of the drive mechanism in Figure 1 but viewing the same from the opposite side thereof.

In the accompanying drawings there is a bicycle 10 that has a frame 12, a front wheel 14 and a rear wheel 16. Other necessary structure in the bicycle is shown in Figure 1 but will not be described in detail. The drive chain 18 is entrained around the rear wheel sprocket 20 in order to actuate rear wheel 16, and it is preferred that there be hand brakes (not shown) by which the bicycle is accelerated and stopped.

My improvement in the drive for the bicycle is seen best in Figures 2 and 3 and consists of a housing 30 having a cylindrical outer wall 31 and side walls 32 and 33, one of which is separably mounted by bolts 34. Housing 30 is welded in the frame 12 or otherwise rigidly attached in a place normally occupied by the main crank bearing casting. Therefore, housing 30 is immovable with respect to the frame of the bicycle.

Power drum 36 is mounted for rotation in the housing 30 and has a circular side wall 37 together with a removable side wall 38. The side wall 38 is held in place by bolts 39 and separably connected to the cylindrical wall 40 of the power drum. Bosses 41 and 42 protrude laterally from the faces of sidewalls 37 and 38 and are internally threaded to accept the sleeves 43 and 44 which are threaded therein. Bearing holders 45 and 46 are at the outer ends of the sleeves 43 and 44 and they accommodate double anti-friction ball bearing assemblies 47 and 48. The inner race of each assembly 47 and 48 seats upon the driveshaft 49 whose ends are fitted with crank arms 50 and 51. The outer extremities of the crank arms have pedals 52 and 53 connected thereto while the inner ends are pinned, keyed or otherwise secured to the drive shaft 48. Anti-friction ball bearings 55 and 56 are in bearing retainers 57 and 58 that protrude from the faces of walls 32 and 33. They are concentric with apertures in walls 32 and 33 of housing 30 and assure that there will be free rotation between sleeves 43 and 44 and the fixed housing 30.

A stout spring 60 is coiled in the power drum 36 and has one end connected to the drum by a pin 61. The opposite end of the spring is connected to the shaft 48, as by being riveted or bolted. Ratchet wheel 64 is keyed or pinned to the shaft 48 and has a resilient dog 65 engaged with the teeth thereof. This dog has a loop intermediate its ends and is connected by bolts 66 to the immovable housing 30. The ratchet wheel and dog 65 permit the shaft 48 to be rotated in a direction for pedalling and winding the spring and prevent it from rotating in the opposite direction.

Chain 18 is not only entrained around sprocket 20 but it is also entrained around the larger sprocket 70. This larger sprocket is secured to the drum driven sleeve 48 by any fasteners that are selected, for example setscrews 71 that pass through holes in collar 72 at the hub of sprocket 70.

A number of stops 74 are spaced on the periphery of power drum 36. Each stop has a shear wall at one side and an inclined surface at the other side enabling the locking lever 75 to ride thereover in one direction but to form a positive lock for the power drum 36 when the bolt 76 on locking lever 75 engages against the shear wall of any of stops 74 (Figure 4). The locking lever 75 is pivoted between ears 78 on the outer wall 31 of housing 30, and bolt 76 thereof is intermediate the ends of the locking lever and movable through hole 80 in housing 30 into the locking positions. Link 81 is pivoted to the outer extremity of locking lever 75 and to handle 82 (Figure 1). Handle 82 is located convenient to the cyclist while he is seated and is pivoted on clamp 83 that is adapted to connect to a convenient part of the frame 12. Detents 84 on the handle 82 and/or clamp 83 hold the handle 82 in a selected position.

In operation the cyclist rotates the pedals 52 and 53 in the usual manner thereby rotating the crank arms 50 and 51 and the crank or driveshaft 48. This causes the spring 60 to drive power drum 36, rotating the same and its sleeves 43 and 44 in the bearings with which they are associated. Since sleeve 43 is driven by the power drum, the sprocket 70 is rotated thereby actuating the chain 18 and propelling the bicycle through the sprocket 18 at the rear wheel.

When pedalling the bicycle in this manner ratchet wheel 64 rotates with the dog 65 overriding it. However, as soon as the cyclist stops rotating the pedals reverse rotation of shaft 48 is prevented because the dog 65 engages the teeth of ratchet wheel 64 preventing it from returning. To store energy in the spring 60, the lever 82 is operated to push the bolt 76 through a hole 80 in the housing 30 into engagement with one of the stops 74 whereby to lock the drum 36 against rotation by the spring 60. Then actuation of the pedals 53 will rotate the drive shaft 48 to wind up the spring 60 and store energy therein. When the spring 60 is wound as may be determined by the feel of the pedals 53, the power drum may be unlocked, in a manner which will be clear, to release the stored energy in the spring 60 to assist in propelling the bicycle by pedalling.

Should the cyclist desire to coast without permitting any stored energy in spring 60 to be expended or to park with the spring 60 wound up, lever 82 is simply moved by the cyclist to lock the power drum 36. Link 81 and lever 75 form the intermediate connecting structure between the bolt 76 and handle 82. With the drum 36 locked in this way, the bicycle will coast due to the coaster mechanism at the back wheel thereof or may be parked with the spring 60 wound up for release of the stored energy for a fast start. The braking for the bicycle is by hand brakes. With the drum 36 unlocked and the bicycle coasting slowly fast pedalling will wind the spring sufficiently to exert energy to assist in pedalling the bicycle in starting up hill or against head winds, or on level ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a coaster brake pedal operated bicycle to be propelled by a cyclist, a mechanical drive for the bicycle comprising a rotary shaft, pedal crank arms operative to rotate the shaft and attached to the ends of said shaft, a wind up spring having one end secured to said shaft, a power drum surrounding the shaft and spring and to which the opposite end of said spring is secured for winding up by pedal operation of the shaft, bearings on said shaft, means including said bearings for mounting said power drum on said shaft for relative rotation with respect to said shaft by energy exerted by the spring incident to winding said spring, and means driven by said power drum for propelling one wheel of the cycle, a fixed housing attached to the cycle and in which said drum is mounted for rotation, said housing having a hole therein, and a latch movable through said hole in engagement with said drum to lock said drum against rotation by said spring in order to hold energy stored within said spring.

2. A bicycle drive mechanism comprising a shaft adapted to be actuated by the cyclist, a sprocket, a chain entrained around said sprocket and adapted to drive the bicycle, bearings rotatable with said sprocket and rotatable with respect to said shaft, a fixed housing in which said bearings are rotatably journaled, a power drum disposed within said housing and fixed to said bearing, a ratchet fast on said shaft, a pawl fast on said housing cooperable with said ratchet for permitting rotation of said shaft in one direction only, a spring attached at one end to said shaft and adapted to store energy therein, the other end of said spring being attached to said power drum, stops on the peripheral surface of said drum, an opening in said housing, a finger mounted for insertion in said opening for engaging one of said stops and prevent rotation of said drum, a linkage controlling the insertion and removal of said finger in said housing.

References Cited in the file of this patent

UNITED STATES PATENTS

| 551,867 | Maggart et al. | Dec. 24, 1895 |
| 557,823 | Jarvis | Apr. 7, 1896 |
| 643,525 | Olson | Feb. 13, 1900 |
| 818,406 | Bartlett | Apr. 24, 1906 |

FOREIGN PATENTS

| 104,067 | Australia | May 25, 1938 |